United States Patent
Kogure (10) Patent No.: US 11,945,519 B2
(45) Date of Patent: Apr. 2, 2024

(54) REACTION FORCE GENERATING DEVICE AND STEERING DEVICE

(71) Applicant: HITACHI ASTEMO, LTD., Hitachinaka (JP)

(72) Inventor: Akihiro Kogure, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 372 days.

(21) Appl. No.: 17/244,213

(22) Filed: Apr. 29, 2021

(65) Prior Publication Data
US 2021/0245794 A1 Aug. 12, 2021

Related U.S. Application Data

(63) Continuation of application No. PCT/JP2019/000295, filed on Jan. 9, 2019.

(30) Foreign Application Priority Data

Dec. 6, 2018 (JP) .................. 2018-229246

(51) Int. Cl.
*B62D 5/00* (2006.01)
*B62D 5/04* (2006.01)
*B62D 6/00* (2006.01)
*B62D 15/02* (2006.01)

(52) U.S. Cl.
CPC .......... *B62D 5/006* (2013.01); *B62D 5/0448* (2013.01); *B62D 6/008* (2013.01); *B62D 15/0215* (2013.01)

(58) Field of Classification Search
CPC .......... B62D 5/006; B62D 6/008; B62D 1/16
See application file for complete search history.

(56) References Cited

U.S. PATENT DOCUMENTS

| 6,688,645 B2 * | 2/2004 | Andonian | B62D 5/001 180/6.26 |
| 2005/0082107 A1 * | 4/2005 | Husain | B62D 5/006 180/402 |

FOREIGN PATENT DOCUMENTS

| JP | 02-175465 A | | 7/1990 |
| JP | 2003048550 A | * | 2/2003 |
| JP | 2004231085 A | * | 8/2004 |
| JP | 2005-178540 A | | 7/2005 |

(Continued)

OTHER PUBLICATIONS

International Search Report dated Feb. 26, 2019 for the corresponding PCT International Application No. PCT/JP2019/000295.

(Continued)

*Primary Examiner* — Bobby Rushing, Jr.
(74) *Attorney, Agent, or Firm* — Leason Ellis LLP; Edward J. Ellis; Melvin C. Garner (57) ABSTRACT

A reaction force generating device for a steering device includes a steering shaft connected to a steering member on which a steering operation is to be performed by a driver, a direct drive motor connected to the steering shaft and configured to generate reaction torque, an electromagnetic brake configured to generate friction torque and including a first friction portion configured to integrally rotate with the steering shaft, a second friction portion provided to face the first friction portion and to be non-rotatable, and an electromagnetic unit configured to press the second friction portion against the first friction portion.

20 Claims, 9 Drawing Sheets

(56) References Cited

FOREIGN PATENT DOCUMENTS

| | | | | |
|---|---|---|---|---|
| JP | 2005247171 | A | * | 9/2005 |
| JP | 2006143102 | A | * | 6/2006 |
| JP | 2007106245 | A | * | 4/2007 |
| JP | 5338491 | B2 | * | 11/2013 |
| JP | 2014-210524 | A | | 11/2014 |
| JP | 5800182 | B2 | * | 10/2015 |
| JP | 2016137875 | A | * | 8/2016 |
| JP | 6167634 | B2 | * | 7/2017 |

OTHER PUBLICATIONS

Written Opinion dated Feb. 26, 2019 for the corresponding PCT International Application No. PCT/JP2019/000295.

* cited by examiner

REACTION FORCE GENERATING DEVICE AND STEERING DEVICE

CROSS-REFERENCE TO RELATED APPLICATION

This application is a continuation of PCT application No. PCT/JP2019/000295, which was filed on Jan. 9, 2019, which claims the benefit of priority to Japanese Application No. 2018-229246, filed Dec. 6, 2018, the contents of both of which are incorporated herein by reference in their entireties.

FIELD OF THE INVENTION

The present invention relates to a reaction force generating device and a steering device using the reaction force generating device.

BACKGROUND OF THE INVENTION

Various steering systems have been developed in order to reduce the burden on a driver who drives an automobile vehicle.

In recent years, a steering system of a steer-by-wire (SBW) manner is under development in which an operation unit that accepts a steering operation by a driver and a turning unit that turns the wheels are mechanically separated, and the steering unit is electrically controlled according to a steering amount of the operation unit.

The steer-by-wire manner has the advantage of being able to eliminate kickback from a road surface, but it requires a reaction force generating device that generates a reaction force to the steering operation in order to provide the driver with a natural feeling of operation.

For example, Patent Literature 1 describes a vehicle steering device in which a reaction force motor that applies a reaction force in a direction opposite to the direction of an operation for steering is attached to a steering member arranged separately from a steering mechanism of a vehicle, and an induction motor is used as the reaction force motor.

Patent Literature 1: JP-A-2005-178540 (published on Jul. 7, 2005)

It is preferable to reduce the size of the reaction force generating device while ensuring a reaction force that can counter the input of the driver.

SUMMARY OF THE INVENTION

The invention has been made in view of the above-described problems, and an object thereof is to provide a reaction force generating device whose size can be reduced while ensuring a reaction force that can counter input of a driver, and a steering device using the reaction force generating device.

In order to solve the above problem, a reaction force generating device according to the present invention is a reaction force generating device for a steering device, the reaction force generating device including a steering shaft connected to a steering member on which a steering operation is to be performed by a driver, a direct drive motor connected to the steering shaft, and an electromagnetic brake connected to the steering shaft.

Advantageous Effects of Invention

According to the reaction force generating device and the steering device of the present invention, it is possible to reduce the size while ensuring a reaction force that can counter the input of a driver.

DETAILED DESCRIPTION OF THE INVENTION

First Embodiment

A steering device 1 according to a first embodiment is described with reference to FIGS. 1 to 4.

Figure 1:
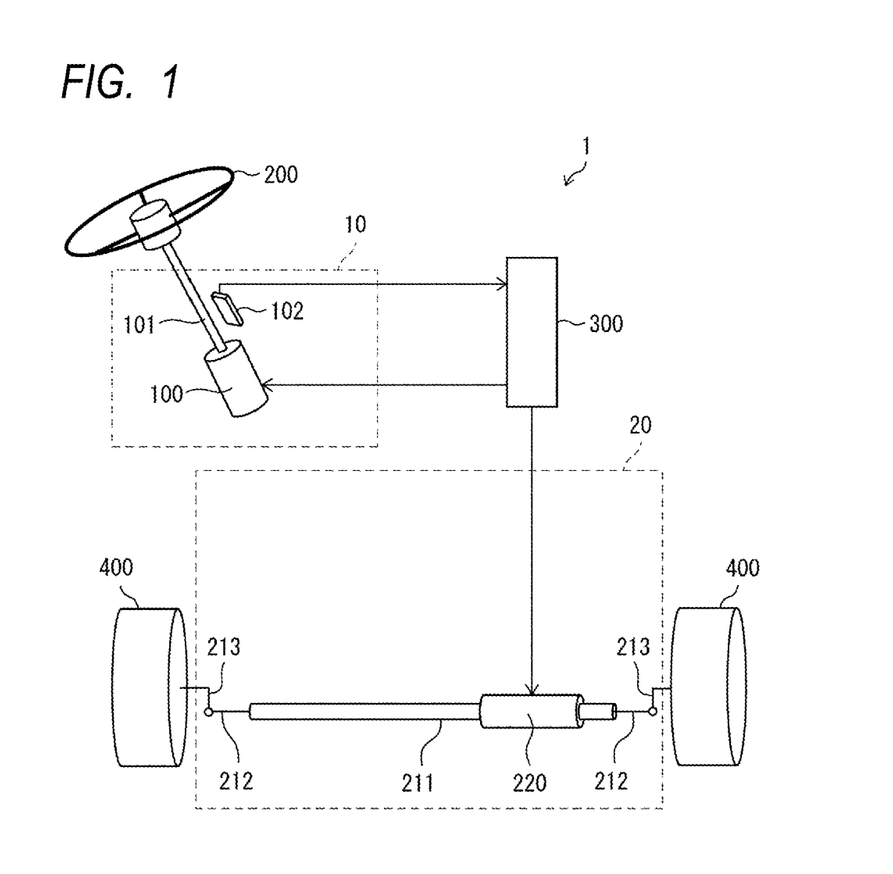
FIG. 1 is a schematic view schematically showing a configuration of a main part of a steering device according to a first embodiment of the present invention.

FIG. 1 is a schematic view schematically showing a configuration of a main part of the steering device 1. As shown in FIG. 1, the steering device 1 includes a steering unit 10, a turning unit 20, a steering member 200, and a control unit 300. The steering device 1 is used to steer wheels 400 in response to a steering operation by a driver via the steering member 200.

As shown in FIG. 1, the steering device 1 is a steering device of the steer-by-wire manner that does not have a mechanical torque transmission path between the steering member 200 and the turning unit 20, but can electrically control a turning angle of the wheels 400 in response to a steering operation via the steering member 200.

As the steering member 200, a steering wheel having a wheel shape is given as an example as shown in FIG. 1, but the present embodiment is not limited thereto, and the steering member 200 may have other shapes or mechanisms as long as a driver can perform a steering operation thereon.

(Steering Unit 10)

The steering unit 10 has both a function of receiving a steering operation by a driver via the steering member 200 and a function of generating a reaction force against the steering operation and transmitting the reaction force to the steering member 200. As shown in FIG. 1, the steering unit 10 includes a reaction force generating device 100, a steering shaft 101, and a torque sensor 102.

In the following description, an "upper end" refers to an end portion on a side closer to the steering member 200, and a "lower end" refers to an end portion on a side farther from the steering member 200.

An upper end of the steering shaft 101 is connected to the steering member 200 such that torque can be transmitted. Here, "connected such that torque can be transmitted" means that members are connected with each other such that rotation of one member causes the rotation of the other member, and at least includes, for example, a case where the one member and the other member are integrally formed, a case where the other member is directly or indirectly fixed to the one member, and a case where the one member and the other member are connected so as to be interlocked with each other via a joint member or the like.

In the present embodiment, the upper end of the steering shaft 101 is fixed to the steering member 200, and the steering member 200 and the steering shaft 101 rotate integrally.

The steering shaft 101 and the reaction force generating device 100 are connected with each other such that torque can be transmitted, and the twist generated in the steering shaft 101 is detected by the torque sensor 102.

More specifically, when a driver performs a steering operation via the steering member 200, a twist angle $\theta_T$ corresponding to the magnitude of torque T of the steering operation is generated in a torsion bar provided in the steering shaft 101. The torque sensor 102 detects the twist angle $\theta_T$ and supplies a torque sensor signal indicating the detection result to the control unit 300. The steering unit 10 may further include a steering angle sensor for detecting a steering angle of the steering member 200, and the steering angle sensor may be configured to supply a signal indicating the detected steering angle or steering angular velocity to the control unit 300. Further, the steering unit 10 may include a steering angle sensor instead of the torque sensor 102, and the steering angle sensor may be configured to supply a signal indicating the detected steering angle or steering angular velocity to the control unit 300.

The reaction force generating device 100 generates torque according to a torque control signal supplied from the control unit 300. A specific configuration of the reaction force generating device 100 will be described later.

(Control Unit 300)

The control unit 300 controls a turning force generated by a turning force generating unit 220 and the torque generated by the reaction force generating device 100 in response to the steering operation by the driver.

More specifically, the control unit 300 refers to the torque sensor signal supplied from the torque sensor 102 to generate the torque control signal for controlling the torque generated by the reaction force generating device 100 and a turning force control signal for controlling the turning force generated by the turning force generating unit 220, and supplies the torque control signal and the turning force control signal to the reaction force generating device 100 and the turning force generating unit 220, respectively.

The control unit 300 may be configured to generate the torque control signal and the turning force control signal by further referring to a signal indicating a steering angle of the steering member 200, a vehicle speed signal from a vehicle speed sensor, and the like.

The control unit 300 controls the reaction force generating device 100 so that the reaction torque in a direction opposite to the steering torque by the driver which is input via the steering member 200 is transmitted to the steering shaft 101. As a result, the driver can obtain a feeling of operation for the steering operation.

(Turning Unit 20)

The turning unit 20 is configured to turn the wheels 400 in response to the steering operation of the driver received by the steering unit 10.

As shown in FIG. 1, the turning unit 20 includes a rack shaft 211, tie rods 212, knuckle arms 213, and the turning force generating unit 220.

The turning force generating unit 220 generates a turning force according to the turning force control signal from the control unit 300, and displaces the rack shaft 211 in an axial direction.

When the rack shaft 211 is displaced in the axial direction, the wheels 400 are turned via the tie rods 212 provided at both ends of the rack shaft 211 and the knuckle arms 213 connected to the tie rods 212.

A specific configuration of the turning force generating unit 220 is not limited to this embodiment, and examples thereof include the following configuration examples.

Configuration Example 1

The turning force generating unit 220 includes a motor, and a conversion mechanism that converts rotational motion of an output shaft of the motor into a linear motion in the axial direction of the rack shaft 211. Here, the conversion mechanism can adopt, for example, a so-called ball screw mechanism configured by a nut having an inner peripheral surface on which a spiral groove is formed, which is rotationally driven by the motor, a spiral groove formed on an outer peripheral surface of the rack shaft and having the same pitch as the spiral groove of the nut, and a plurality of rolling balls sandwiched between the spiral groove of the nut and the spiral groove of the rack shaft.

Furthermore, the turning force generating unit 220 can be configured to include a drive pulley connected to the output shaft of the motor arranged along the rack shaft 211 such that torque can be transmitted, a driven pulley connected to the nut such that torque can be transmitted, and a suspension member that is suspended between the drive pulley and the driven pulley and transmits torque from the drive pulley to the driven pulley.

Configuration Example 2

The turning force generating unit 220 may include a hollow motor coaxially arranged with the rack shaft 211, and the nut in Configuration Example 1 may be rotationally driven by the hollow motor. According to such a configuration, the drive pulley and the driven pulley in the Configuration Example 1 are not required, so that space can be saved.

Configuration Example 3

Instead of the ball screw mechanism, the turning force generating unit 220 may be configured to include a second pinion shaft that is rotationally driven by a motor, and a pinion gear that is connected to the second pinion shaft such that torque can be transmitted, and that meshes with the second rack formed on the rack shaft 211.

Configuration Example 4

The turning force generating unit 220 may be provided for each of the left, right, front, and rear wheels 400. According to such a configuration, the wheels 400 can be turned independently.

(Reaction Force Generating Device 100)

Figure 2:
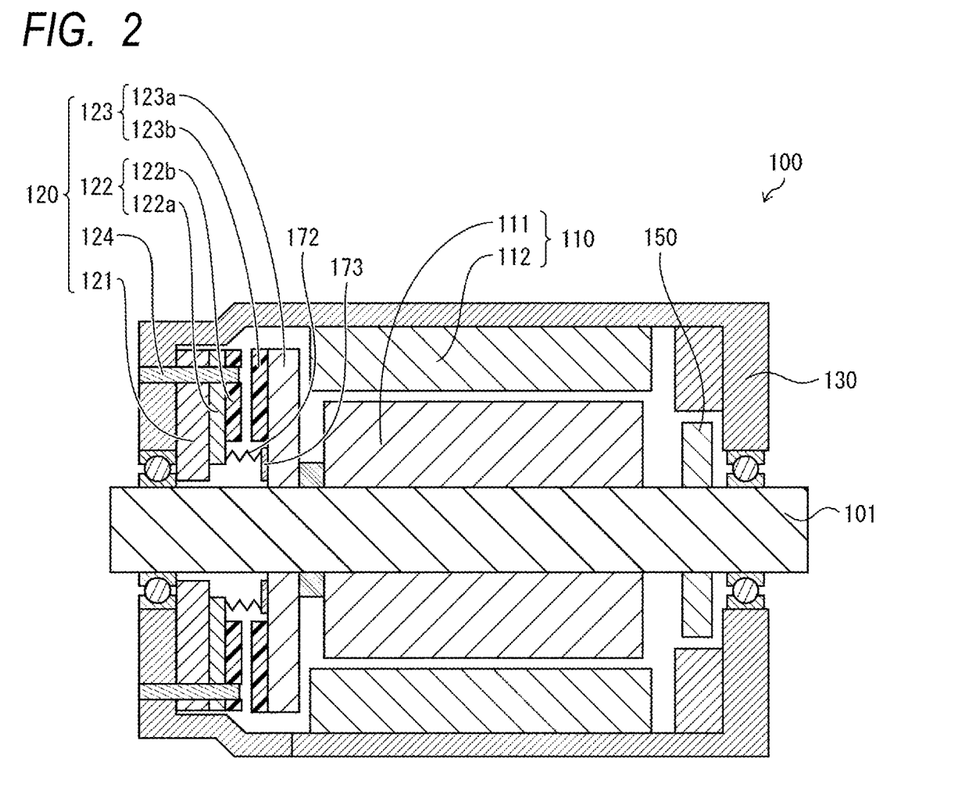
FIG. 2 is a sectional view of a reaction force generating device when an electromagnetic brake is not in operation according to the first embodiment of the present invention.
Figure 3:
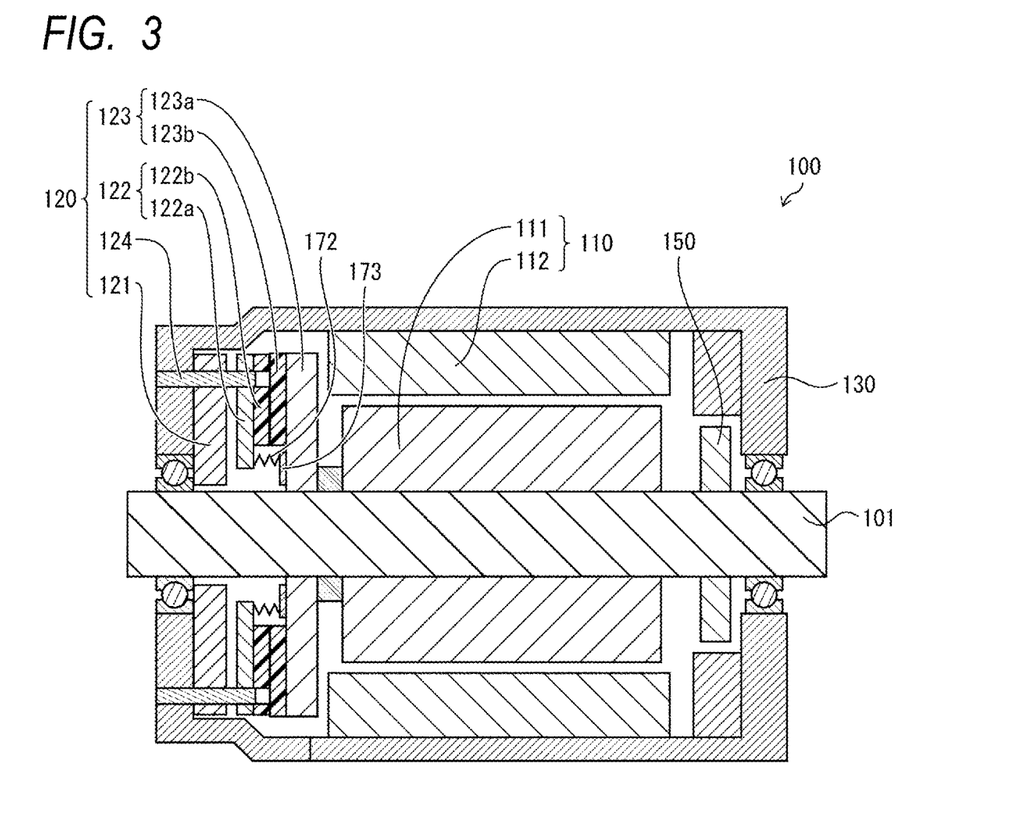
FIG. 3 is a sectional view of the reaction force generating device when the electromagnetic brake is in operation according to the first embodiment of the present invention.

Next, a configuration example of the reaction force generating device 100 is described more specifically with reference to FIGS. 2 and 3. FIG. 2 is a sectional view showing a configuration example of the reaction force generating device 100.

FIG. 2 is a sectional view of the reaction force generating device 100 when an electromagnetic brake 120 described later is not in operation, and FIG. 3 is a sectional view of the reaction force generating device 100 when the electromagnetic brake 120 is in operation.

As shown in FIG. 2, the reaction force generating device 100 includes a direct drive motor 110, the electromagnetic brake 120, a housing 130, a rotation angle sensor 150, and a second spring 172.

The direct drive motor 110 includes a motor rotor 111 and a motor core 112. The motor rotor 111 is fixedly connected to the steering shaft 101, and the motor rotor 111 and the steering shaft 101 rotate integrally. The motor rotor 111 may be configured to include a plurality of permanent magnets as an example, but the present embodiment is not limited thereto. The motor core 112 is fixedly connected to the housing 130 and is an electromagnetic component for applying reaction torque to the motor rotor 111. As an example, the motor core 112 may be configured to include a plurality of electromagnets whose polarity and magnitude of the electric field are controlled by the torque control signal supplied from the control unit 300, but the present embodiment is not limited thereto.

The direct drive motor 110 configured as described above rotates the motor rotor 111 according to the torque control signal supplied from the control unit 300, and the motor rotor 111 and the steering shaft 101 are integrally rotated. As a result, the direct drive motor 110 generates reaction torque in response to the steering operation by the driver.

The rotation angle sensor 150 detects a rotation angle of the steering shaft 101, and supplies a rotation angle signal indicating the detected result to the control unit 300. The rotation angle signal may be directly supplied to the electromagnetic brake 120.

The electromagnetic brake 120 includes an electromagnetic unit 121, a first friction portion 123, a second friction portion 122, and a support pin 124. The first friction portion 123 includes a first friction plate support portion 123a and a first friction plate 123b. The first friction plate support portion 123a is fixedly connected to the steering shaft 101, and therefore, the first friction plate support portion 123a and the steering shaft 101 rotate integrally. Further, on a side of the first friction plate support portion 123a facing the second friction portion 122, the first friction plate 123b is fixedly provided with respect to the first friction plate support portion 123a.

On the other hand, the second friction portion 122 includes a second friction plate support portion 122a and a second friction plate 122b. The second friction plate support portion 122a is supported by the support pin 124 so as to be non-rotatable about the axis of the steering shaft 101 in the axial direction and slidable in the axial direction. More specifically, a through hole is formed in the second friction plate support portion 122a, one end of the through hole is fixedly connected to the housing 130, and the support pin 124 extending along the axial direction of the steering shaft 101 penetrates the through hole. On a side of the second friction plate support portion 122a facing the first friction plate 123b, the second friction plate 122b is fixedly provided with respect to the second friction plate support portion 122a.

The electromagnetic unit 121 is fixed to the housing 130 so as to be non-rotatable around the axis of the steering shaft 101 in the axial direction and non-slidable in the axial direction. More specifically, a through hole is formed in the electromagnetic unit 121, and the support pin 124 penetrates through the through hole.

The electromagnetic unit 121 slides the second friction portion 122 in the axial direction of the steering shaft 101 in response to the rotation angle signal detected by the rotation angle sensor 150. The electromagnetic unit 121 slides the second friction portion 122 toward the first friction portion 123, so that the second friction plate 122b presses against the first friction plate 123b. Therefore, the first friction plate 123b and the second friction plate 122b come into contact with each other to generate friction torque. As a result, the reaction torque caused by the electromagnetic brake 120 is applied to the steering shaft 101.

The electromagnetic unit 121 may be configured to operate in response to a steering angle signal of a steering angle sensor (not shown) of the steering member 200 instead of the rotation angle signal. Further, it is preferable that the members used for the first friction plate 123b and the second friction plate 122b have a quiet operation noise when the electromagnetic brake 120 is in operation, are excellent in release ability of the electromagnetic brake 120, and reduce a phenomenon such as being flipped when the electromagnetic brake 120 is in operation. However, the present embodiment is not limited thereto.

The housing 130 accommodates the direct drive motor 110 and the electromagnetic brake 120. The direct drive motor 110 and the electromagnetic brake 120 are accommodated in the housing 130, so that the size of the reaction force generating device 100 can be reduced.

The second spring 172 is arranged between the first friction portion 123 and the second friction portion 122. More specifically, one end portion of the second spring 172 is connected to a surface of the first friction plate support portion 123a on a side opposite to the direct drive motor 110 via a rotatably slidable member 173, and the other end portion of the second spring 172 is connected to a surface of the second friction plate support portion 122a opposite to the electromagnetic unit 121.

Next, the reaction torque generated in the reaction force generating device 100 is described with reference to FIG. 4.

Figure 4:
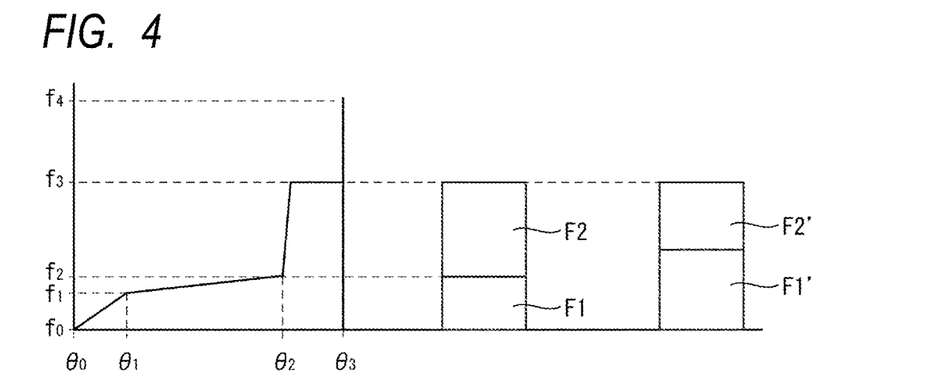
FIG. 4 is a graph showing reaction torque generated in the reaction force generating device according to the first embodiment of the present invention.

The line graph shown in FIG. 4 shows the correspondence between a steering angle of the steering member 200 and reaction torque to be generated in the reaction force generating device 100. In the line graph of FIG. 4, the horizontal axis represents the steering angle of the steering member 200, and the vertical axis represents the reaction torque to be generated in the reaction force generating device 100. A steering angle $\theta_0$ indicates an angle of an initial position of the steering member 200, and steering angles $\theta_1$ to $\theta_3$ indicate angles when the steering member 200 is steered clockwise or counterclockwise with the steering angle $\theta_0$ as a starting point. Here, in the present embodiment, a steering angle θ2 is a steering angle of the steering member 200 corresponding to the maximum turning angle of the turning unit 20. Further, in the present embodiment, the steering angle $\theta_1$ may be referred to as a predetermined steering angle, and the steering angle $\theta_2$ may be referred to as a specified steering angle (first steering angle in Claims). A range from the steering angle $\theta_0$ to the steering angle $\theta_2$ indicates a normal turning range in which the turning unit 20 can be turned corresponding to the steering angle of the steering member 200, and a range from the steering angle $\theta_2$ to the steering angle $\theta_3$ is an abnormal turning range in which the turning unit 20 cannot be turned corresponding to the steering angle of the steering member 200. A range from reaction torque $f_0$ to reaction torque $f_2$ indicates a value of normal steering reaction force, which is reaction torque generated by the direct drive motor 110, and a range from the reaction torque $f_0$ to reaction torque $f_3$ indicates a value of normal wall reaction force, which is reaction torque obtained by combining the reaction torque generated by the direct drive motor 110 and the friction torque generated by the electromagnetic brake 120. Further, reaction torque $f_4$ indicates a value of the reaction torque that can counter excessive input when the driver performs excessively input on the steering member 200.

Here, reaction torque generated in the normal turning range is based on the reaction torque generated by the direct drive motor 110, and reaction torque generated in an idling range is based on the reaction torque generated by the direct drive motor 110 and the friction torque generated by the electromagnetic brake 120. As shown in FIG. 4, the direct drive motor 110 increases the reaction torque from $f_0$ to $f_1$ at a constant rate of increase in a range of steering angle $\theta_0$ to $\theta_1$, and then reduces the rate of increase of the reaction torque to increase the reaction torque from $f_1$ to $f_2$ in a range of steering angle $\theta_1$ to $\theta_2$. Further, as shown in FIG. 4, the electromagnetic brake 120 sharply increases the value of the reaction torque to $f_3$ by generating the friction torque, and then maintains the value of the reaction torque at $f_3$.

The laminated graph shown in FIG. 4 is a graph showing the reaction torque generated by each mechanism included in the reaction force generating device 100. Reaction torque F1 indicates the reaction torque generated by the direct drive motor 110, and reaction torque F2 indicates the friction torque generated by the electromagnetic brake 120. As shown in FIG. 4, a reaction force ratio of the reaction torque F1 to the reaction torque F2 changes into a reaction force ratio of reaction torque F1' to reaction torque F2' by changing the configuration such as the size of the direct drive motor 110 and the electromagnetic brake 120 used in the reaction force generating device 100.

In this way, the reaction force generating device 100 can secure the reaction force that can counter the input of the driver by using the friction torque generated by the electromagnetic brake 120 in addition to the reaction torque generated by the direct drive motor 110.

Second Embodiment

Hereinafter, a reaction force generating device 100a according to a second embodiment is described with reference to FIGS. 5 to 8.

Figure 5:
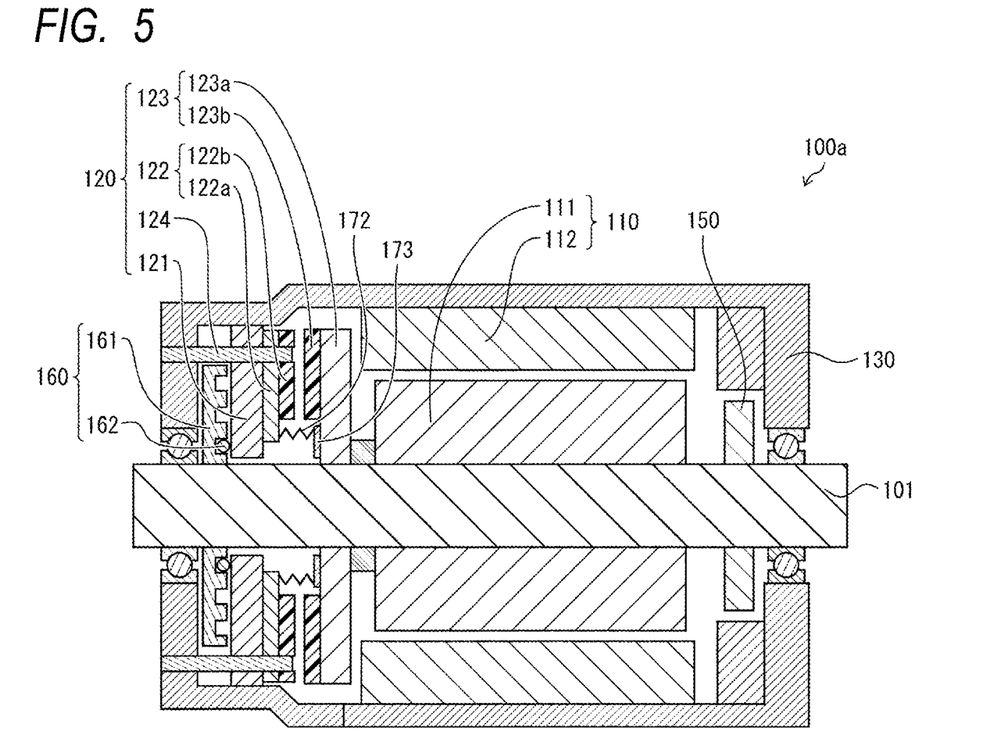
FIG. 5 is a sectional view of a reaction force generating device according to a second embodiment of the present invention.

FIG. 5 is a sectional view showing a configuration example of the reaction force generating device 100a. The reaction force generating device 100a according to the present embodiment further includes a steering angle regulating mechanism 160 in the reaction force generating device 100 according to the first embodiment. In the following description, members the same as those already described are denoted by the same reference numerals, and the description thereof will be omitted.

The steering angle regulating mechanism 160 includes a rotating substrate 161 that rotates integrally with the steering shaft 101, which is a rotating substrate fixedly connected to the steering shaft 101, and at least one guide ball 162. The steering angle regulating mechanism 160 regulates the steering of the steering member 200 when the steering angle of the steering member 200 reaches the specified steering angle. The method of regulating the steering of the steering member 200 by the steering angle regulating mechanism 160 will be described later.

Here, the housing 130 according to the present embodiment accommodates the steering angle regulating mechanism 160 in addition to the direct drive motor 110 and the electromagnetic brake 120. The direct drive motor 110, the electromagnetic brake 120, and the steering angle regulating mechanism 160 are accommodated in the housing 130, so that the size of the reaction force generating device 100 can be reduced.

The electromagnetic unit 121 of the electromagnetic brake 120 is fixed to the housing 130 so as to be non-rotatable around the axis of the steering shaft 101 in the axial direction and non-slidable in the axial direction. More specifically, a through hole is formed in the electromagnetic unit 121, and the support pin 124 penetrates through the through hole. Further, the electromagnetic unit 121 is fixed to the housing 130 at a surface intersecting a radial direction of the steering shaft 101.

Similar to the first embodiment, the electromagnetic unit 121 slides the second friction portion 122 in the axial direction of the steering shaft 101 in response to the rotation angle signal detected by the rotation angle sensor 150. The electromagnetic unit 121 slides the second friction portion 122 toward the first friction portion 123, so that the second friction plate 122b presses against the first friction plate 123b. Therefore, the first friction plate 123b and the second friction plate 122b come into contact with each other to generate friction torque. As a result, the reaction torque caused by the electromagnetic brake 120 is applied to the steering shaft 101.

(Steering Angle Regulating Mechanism 160)

Figure 6:
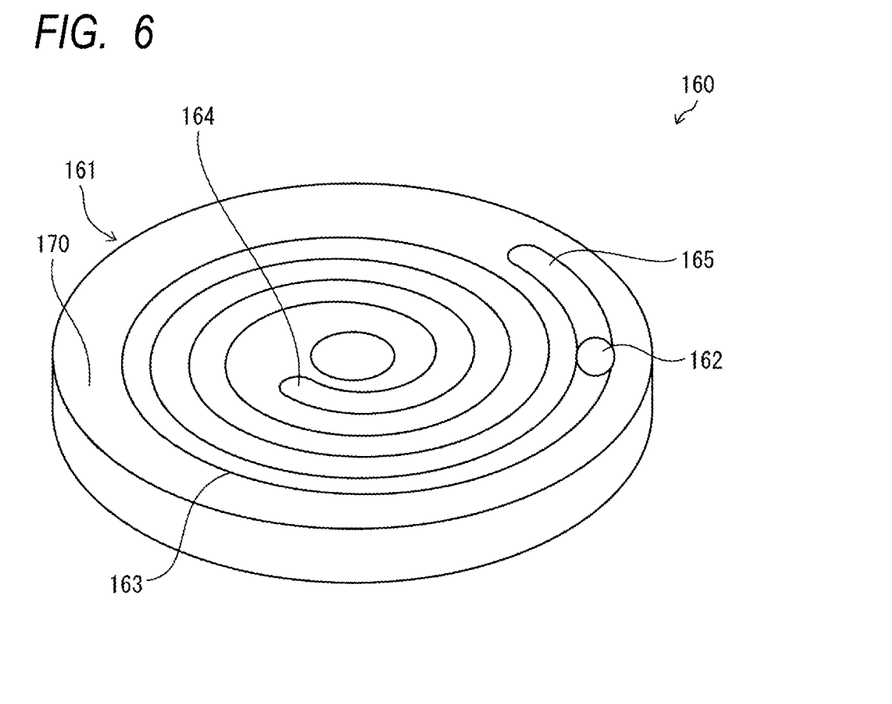
FIG. 6 is a top perspective view of a steering angle regulating mechanism according to the second embodiment of the present invention.
Figure 7:
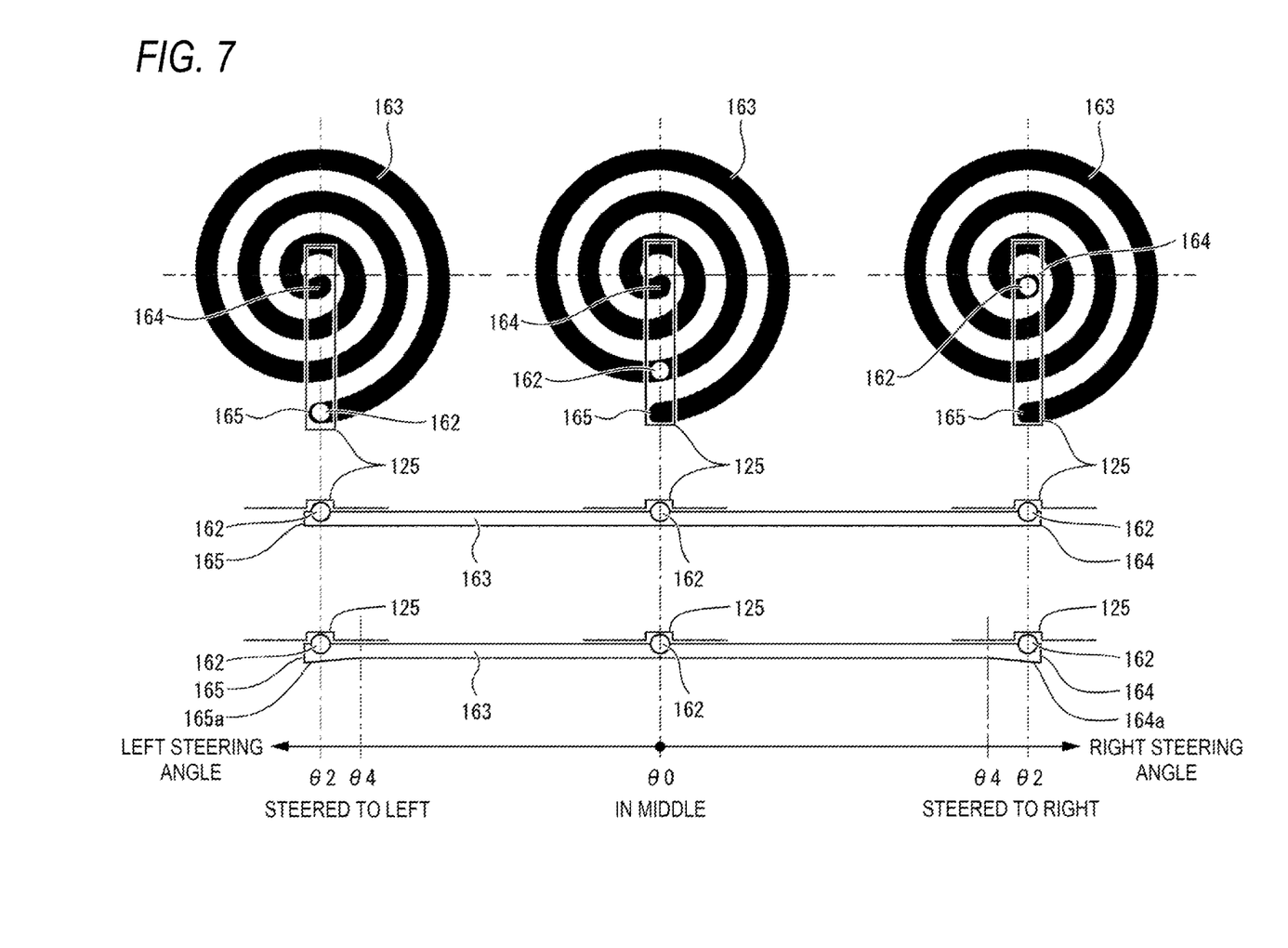
FIG. 7 is a diagram showing a configuration example of the steering angle regulating mechanism according to the second embodiment of the present invention.

Next, a configuration example of the steering angle regulating mechanism 160 is described more specifically with reference to FIGS. 6 and 7. FIG. 6 is a top perspective view of the steering angle regulating mechanism 160.

As shown in FIG. 6, the rotating substrate 161 included in the steering angle regulating mechanism 160 is formed with a spiral groove 163 having two end portions 164, 165 on a surface 170 facing a surface of the electromagnetic unit 121 on a side opposite to the second friction portion 122. Further, as shown in FIG. 6, in the rotating substrate 161, at least one or more guide balls 162 are arranged on the spiral groove 163. The guide ball 162 moves on the spiral groove 163 in response to the steering of the steering member 200.

Next, the movement of the guide ball 162 in the steering angle regulating mechanism 160 is described with reference to FIG. 7. FIG. 7 shows the arrangements of the guide ball 162 on the spiral groove 163 when the steering member 200 is steered counterclockwise (steered to the left) to the specified steering angle $\theta_2$, when the steering member 200 is not steered, and when the steering member 200 is steered clockwise (steered to the right) to the specified steering angle $\theta_2$.

As shown in FIG. 7, when the guide ball 162 is arranged in the middle position from $\theta_0$ to less than $\theta_2$, the guide ball 162 does not come into contact with these two end portions 164, 165 of the spiral groove 163, and the steering of the steering member 200 is not regulated. Further, when the steering member 200 is steered counterclockwise to the specified steering angle $\theta_2$, the guide ball 162 is arranged at a position indicated by "steered to left" in FIG. 7, and the guide ball 162 comes into contact with the end portion 165 of the spiral groove 163. Further, when the steering member 200 is steered clockwise to the specified steering angle $\theta_2$, the guide ball 162 is arranged at a position indicated by "steered to right" in FIG. 7, and the guide ball 162 comes into contact with the end portion 164 of the spiral groove 163. In this way, when the steering angle of the steering member 200 reaches the specified steering angle $\theta_2$, the guide ball 162 comes into contact with the end portions 164, 165 of the spiral groove 163. Thereby, the steering of the steering member 200 can be regulated. The spiral groove 163 is described using a flat shape in FIG. 7, but the present embodiment is not limited thereto, and for example, a groove depth at these two end portions 164, 165 may be deeper than that of positions other than these two end portions 164, 165 in the spiral groove 163.

More specifically, deep groove portions 164a, 165a at which a groove depth is relatively deep are formed at these two end portions 164, 165 of the spiral groove 163. The deep groove portions 164a, 165a are provided from the respective end portions 164, 165 of the spiral groove 163 over a predetermined length. When the steering angle of the steering member 200 becomes equal to or more than a predetermined steering angle $\theta_4$ (second steering angle in Claims), the guide ball 162 is arranged in the deep groove portions 164a, 165a and moves in a direction away from the electromagnetic unit 121. Here, the steering angle $\theta_4$ is less than the specified steering angle $\theta_2$.

A radial groove 125 is formed on the surface of the electromagnetic unit 121 on a side opposite to the second friction portion 122, and the guide ball 162 is arranged at an intersection of the spiral groove 163 and the radial groove 125, so that the guide ball 162 can be prevented from being displaced in the spiral groove 163.

Next, reaction torque generated in the reaction force generating device 100a is described with reference to FIG. 8.

Figure 8:
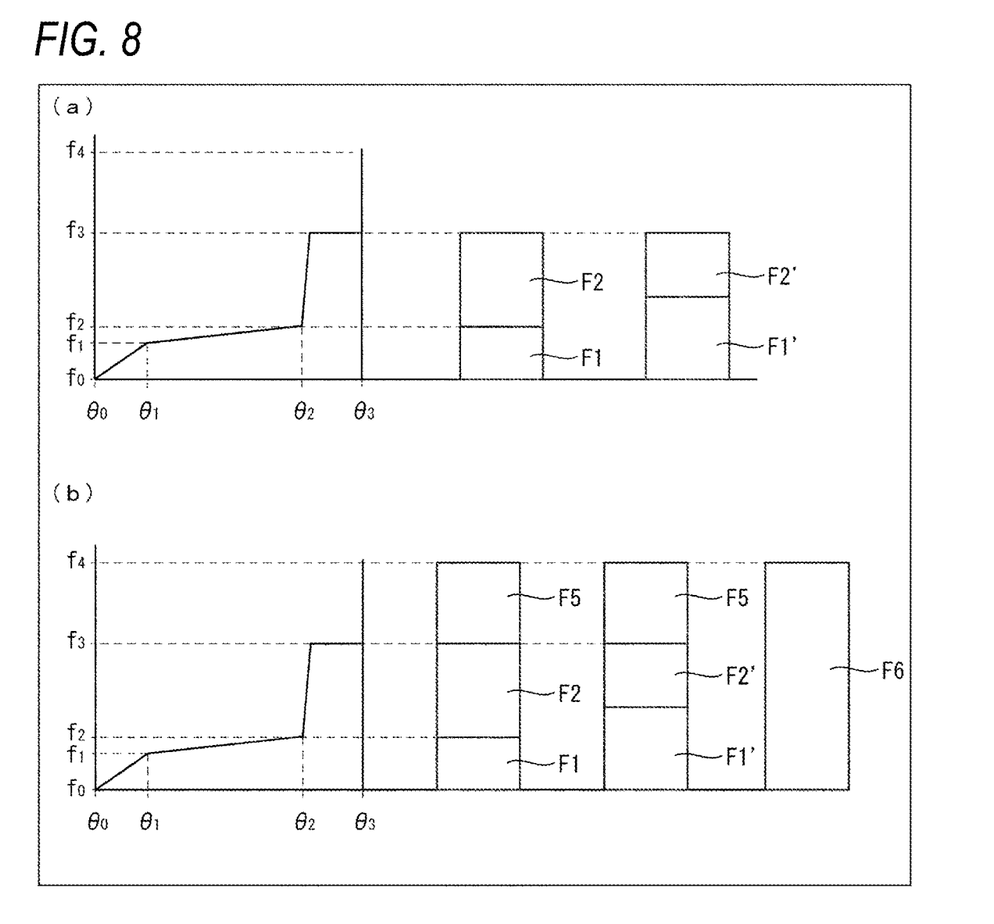
FIG. 8 is a graph showing reaction torque generated in the reaction force generating device according to the second embodiment of the present invention.

The laminated graph shown in FIG. 8 is a graph showing the reaction torque generated by each mechanism included in the reaction force generating device 100a. Reaction torque F5 and reaction torque F6 indicate reaction torque generated by the steering angle regulating mechanism 160.

More specifically, in the reaction force generating device 100a, when the steering angle of the steering member 200 is less than the predetermined steering angle, as shown in (a) of FIG. 8, the reaction torque F1 generated by the direct drive motor 110 and the reaction torque F2 generated by the electromagnetic brake 120 are combined to generate reaction torque.

Further, in the reaction force generating device 100a, when the steering angle of the steering member 200 reaches the specified steering angle, as shown in (b) of FIG. 8, in addition to the reaction torque F1 and the reaction torque F2, reaction torque F5 generated by the steering angle regulating mechanism 160 is also combined to generate reaction torque. Here, the reaction torque F5 indicates the reaction torque generated when the guide ball 162 comes into contact with the end portions 164, 165. Here, the reaction torque obtained by combining the reaction torque F1, the reaction torque F2, and the reaction torque F5 corresponds to the reaction torque $f_4$ that can counter the excessive input to the steering member 200. As shown in (b) of FIG. 8, even when the direct drive motor 110 and the electromagnetic brake 120 are not in operation, the steering angle regulating mechanism 160 can generate reaction torque F6 corresponding to the reaction torque $f_4$ that can counter the excessive input. Here, the reaction torque F6 indicates the reaction torque generated when the guide ball 162 comes into contact with the end portions 164, 165.

In this way, the reaction force generating device 100a can secure the reaction force that can counter the input of the driver by using the reaction torque generated by the steering angle regulating mechanism 160 in addition to the reaction torque generated by the direct drive motor 110 and the friction torque generated by the electromagnetic brake 120.

Third Embodiment

Hereinafter, a reaction force generating device 100b according to a third embodiment is described with reference to FIGS. 9 to 11.

Figure 9:
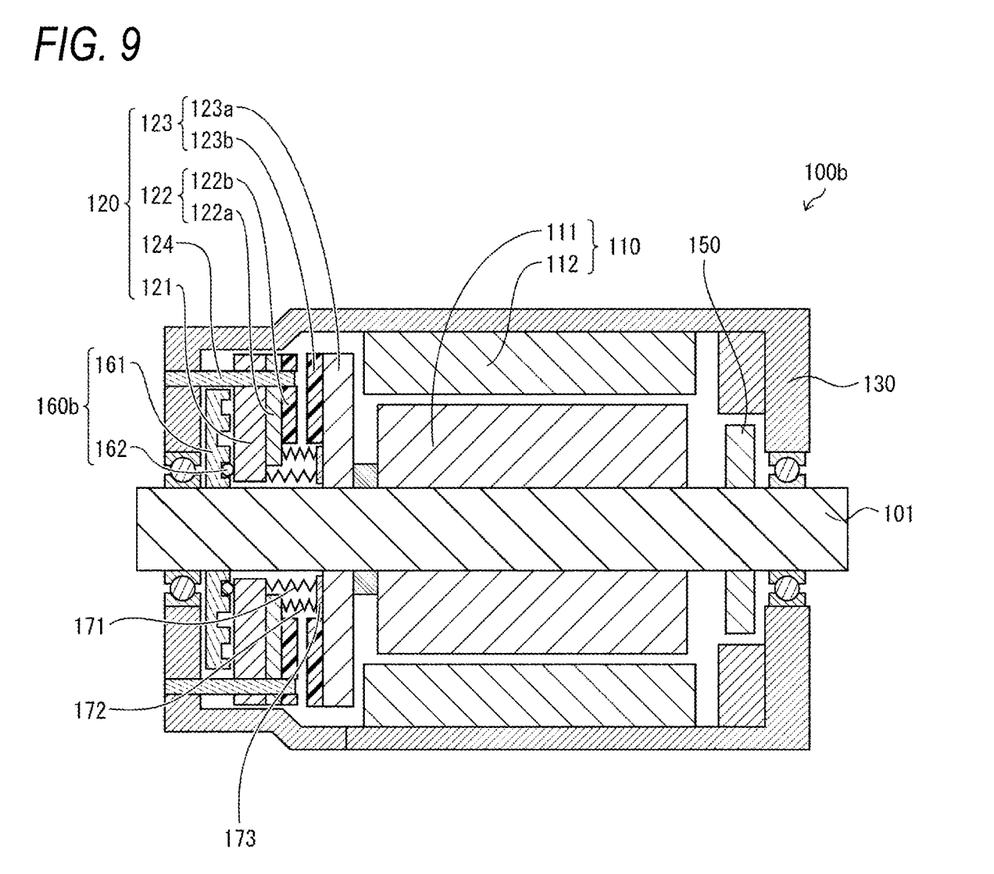
FIG. 9 is a sectional view of a reaction force generating device according to a third embodiment of the present invention.

FIG. 9 is a sectional view showing a configuration example of the reaction force generating device 100b. The reaction force generating device 100b according to the present embodiment includes a steering angle regulating mechanism 160b instead of the steering angle regulating mechanism 160 in the reaction force generating device 100a according to the second embodiment, and further includes a first spring 171. In the following description, members the same as those already described are denoted by the same reference numerals, and the description thereof will be omitted.

The first spring 171 is arranged between the electromagnetic unit 121 and the first friction portion 123. More specifically, one end portion of the first spring 171 is connected to a surface of the electromagnetic unit 121 on a side opposite to the steering angle regulating mechanism 160b, and the other end portion of the first spring 171 is connected to a surface of the first friction plate support portion 123a on a side opposite to the direct drive motor 110 via the rotatably slidable member 173.

The first spring 171 can increase the force for pressing the electromagnetic unit 121 against the rotating substrate 161 by the repulsive force generated when the spring contracts, so as to increase ball sliding resistance.

The movement of the guide ball 162 in the steering angle regulating mechanism 160 is described with reference to FIG. 10.

Figure 10:
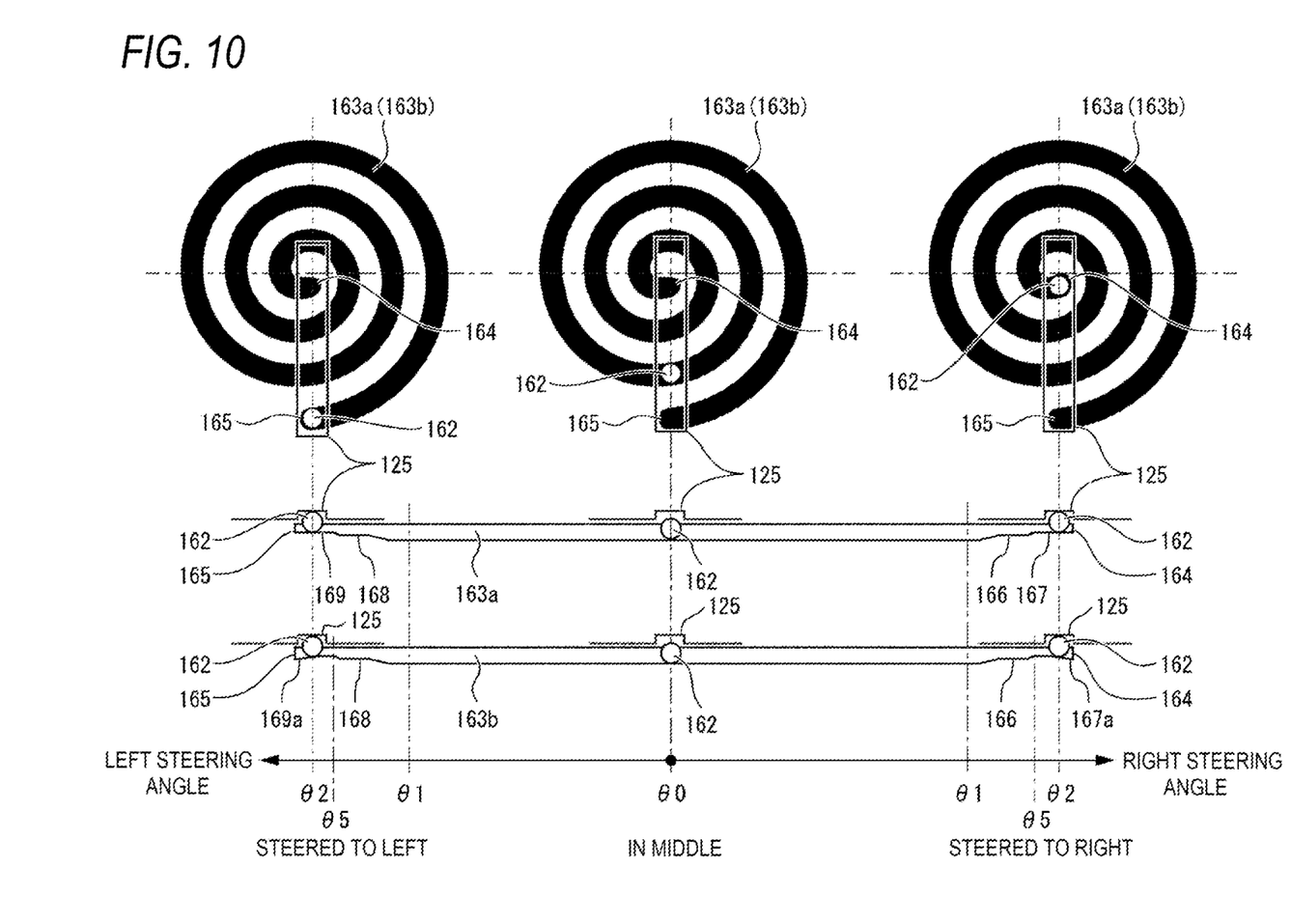
FIG. 10 is a diagram showing a configuration example of a steering angle regulating mechanism according to the third embodiment of the present invention.

As shown in FIG. 10, in the steering angle regulating mechanism 160b according to the present embodiment, first shallow groove portions 168, 166 at which a groove depth is relatively shallow, and second shallow groove portions 169, 167 at which a groove depth is shallower than that of the first shallow groove portions 168, 166 are formed at these two end portions 164, 165 of the spiral groove 163a. The first shallow groove portions 168, 166 are provided from the respective end portions 164, 165 of the spiral groove 163 over a first predetermined length. Further, the second shallow groove portions 169, 167 are provided from the respective end portions 164, 165 of the spiral groove 163 over a second predetermined length. Here, the second predetermined length is provided to be shorter than the first predetermined length in the spiral groove 163a.

As shown in FIG. 10, when the steering angle of the steering member 200 is less than a predetermined steering angle $\theta_1$, the guide ball 162 is arranged at a position other than these two end portions 164, 165 of the spiral groove 163a. Further, when the steering angle of the steering member 200 becomes equal to or more than the predetermined steering angle $\theta_1$ (third steering angle in Claims) which is less than the specified steering angle $\theta_2$, the guide ball 162 is arranged in the first shallow groove portions 168, 166 of the spiral groove 163a. By arranging the guide ball 162 in the first shallow groove portions 168, 166, the guide ball 162 can press the electromagnetic unit 121 against the second friction portion 122. As a result, the friction torque generated by the electromagnetic brake 120 increases. Further, when the steering member 200 is steered counterclockwise to the specified steering angle $\theta_2$, the guide ball 162 is arranged at a position indicated by "steered to left" in FIG. 10. As a result, the guide ball 162 is arranged in the second shallow groove portion 169 of the spiral groove 163a and comes into contact with the end portion 165 of the spiral groove 163a. Further, when the steering member 200 is steered clockwise to the specified steering angle $\theta_2$, the guide ball 162 is arranged at a position indicated by "steered to right" in FIG. 10. As a result, the guide ball 162 is arranged in the second shallow groove portion 167 of the spiral groove 163a and comes into contact with the end portion 164 of the spiral groove 163a. By arranging the guide ball 162 in the second shallow groove portions 169, 167, the guide ball 162 can press the electromagnetic unit 121 until the first friction portion 123 and the second friction portion 122 are completely in close contact with each other. As a result, the friction torque in the electromagnetic brake 120 is further increased. Further, the steering of the steering member 200 is regulated by the guide ball 162 coming into contact with the end portions 164, 165 of the spiral groove 163a.

The depth of the second shallow groove portions 169, 167 of the spiral groove 163a may be set such that a contact load between the first friction portion 123 and the second friction portion 122 is reduced or the contact therebetween is released when the guide ball 162 comes into contact with the end portions 164, 165 to generate the reaction torque that can counter the excessive input.

More specifically, as shown in FIG. 10, the spiral groove 163b may be set such that the groove depth of the second shallow groove portions 169a, 167a is deeper than the groove depth of the first shallow groove portions 168, 166. When the steering angle of the steering member 200 becomes equal to or more than a predetermined steering angle $\theta_5$ (fourth steering angle in Claims), the guide ball 162 is arranged in the second shallow groove portions 169a, 167a and moves in the direction away from the electromagnetic unit 121. As a result, damage to the first friction portion 123 and the second friction portion 122 can be prevented. Here, the steering angle $\theta_5$ is less than the specified steering angle $\theta_2$ and equal to or greater than the predetermined steering angle $\theta_1$.

The specified steering angle of the steering angle of the steering member can be set to an optional angle by setting a length between the end portion 164 and the end portion 165 of the spiral groove 163a, in other words, the positions of these two end portions 164, 165 of the spiral groove in the steering angle regulating mechanism 160b. Therefore, these two end portions 164, 165 of the spiral groove 163a can be rephrased as optional angle stoppers.

Next, the reaction torque generated in the reaction force generating device 100b is described with reference to FIG. 11.

Figure 11:
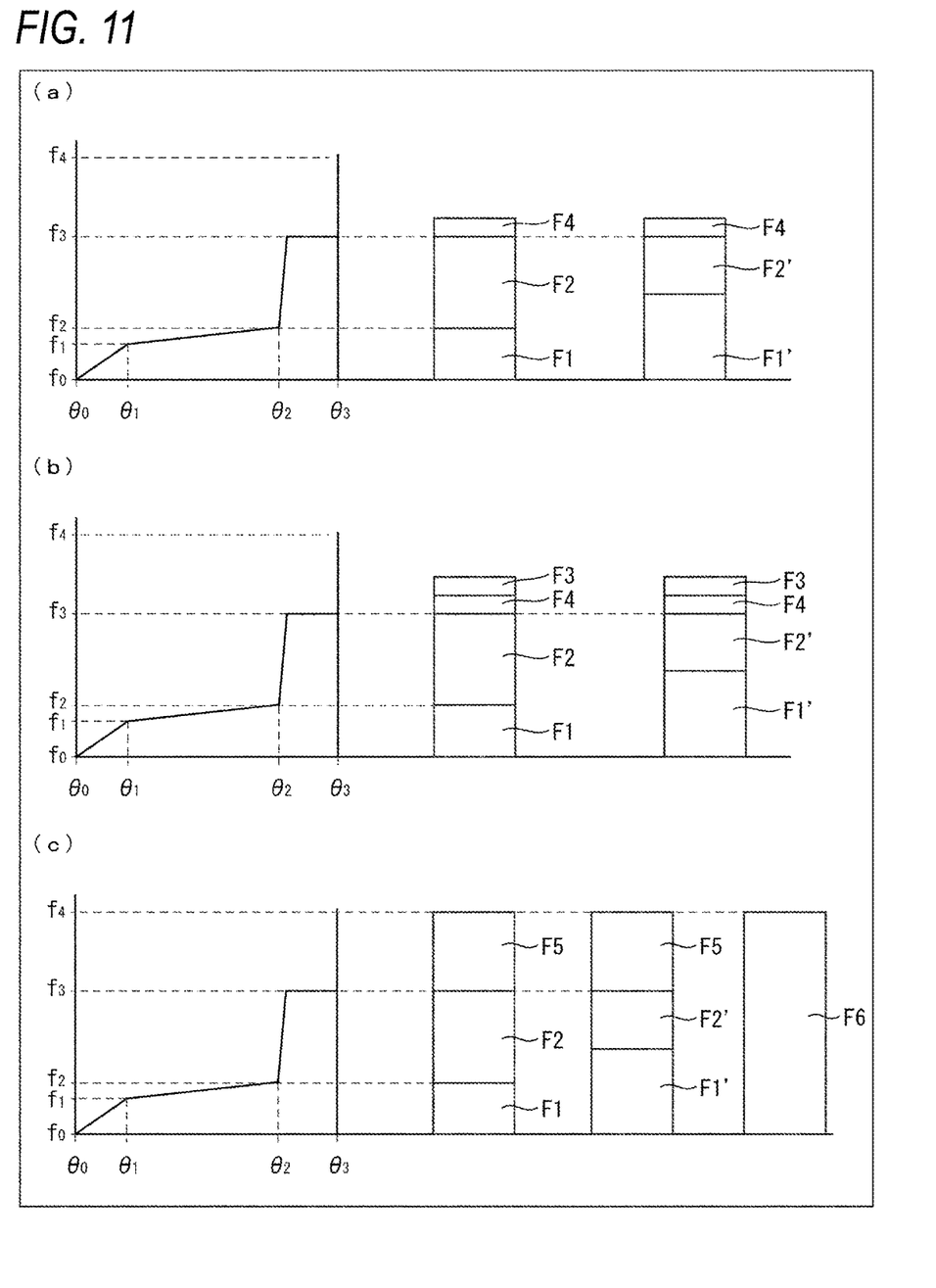
FIG. 11 is a graph showing reaction torque generated in the reaction force generating device according to the third embodiment of the present invention.

The laminated graph shown in FIG. 11 is a graph showing reaction torque generated by each mechanism included in the reaction force generating device 100b. Reaction torque F3 in FIG. 11 indicates the reaction torque generated by the steering angle regulating mechanism 160b, and reaction torque F4 in FIG. 11 indicates the reaction torque generated by the first spring 171.

More specifically, in the reaction force generating device 100b, when the steering angle of the steering member 200 is less than the predetermined steering angle, as shown in (a) of FIG. 11, the reaction torque F1 generated by the direct drive motor 110, the reaction torque F2 generated by the electromagnetic brake 120, and the reaction torque F4 generated by the first spring 171 are combined to generate reaction torque. Here, the reaction torque F4 indicates the reaction torque generated by the repulsive force generated when the spring of the first spring 171 contracts.

Further, in the reaction force generating device 100b, when the steering angle of the steering member 200 is less than the specified steering angle and is equal to or greater than the predetermined steering angle, as shown in (b) of FIG. 11, in addition to the reaction torque F1, the reaction torque F2, and the reaction torque F4, the reaction torque F3 generated by the steering angle regulating mechanism 160b is also combined to generate reaction torque. Here, the reaction torque F3 indicates the reaction torque generated by the increase in electromagnetic force due to the sliding of the electromagnetic unit 121 of the steering angle regulating mechanism 160b and the decrease in the clearance with the second friction plate support portion 122a.

Further, in the reaction force generating device 100b, when the steering angle of the steering member 200 reaches the specified steering angle, as shown in (c) of FIG. 11, in addition to the reaction torque F1 and the reaction torque F2, the reaction torque F5 generated by the steering angle regulating mechanism 160b is also combined to generate reaction torque. As shown in (c) of FIG. 11, even when the direct drive motor 110 and the electromagnetic brake 120 are not in operation, the steering angle regulating mechanism 160b can generate the reaction torque F6 corresponding to the reaction torque $f_4$ that can counter the excessive input.

In this way, the reaction force generating device 100a can secure the reaction force that can counter the input of the driver by using the reaction torque generated by the first spring 171 and the second spring 172 in addition to the reaction torque generated by the direct drive motor 110, the friction torque generated by the electromagnetic brake 120, and the reaction torque generated by the steering angle regulating mechanism 160b.

The present invention is not limited to the embodiments described above, various modifications can be made within the scope of the claims, and embodiments obtained by appropriately combining technical means disclosed in different embodiments are also included in the technical scope of the present invention.

Further, a configuration in which the steering angle θ2 is a steering angle of the steering member corresponding to the maximum turning angle of the turning unit 20 is shown as an example, but the present invention is not limited thereto. For example, when the maximum turning angle of the turning unit 20 is in a regulated state, the steering angle θ2 can be set to an angle before reaching the maximum turning angle. Further, in the present embodiment, the "maximum turning angle" includes not only the maximum turning angle determined by a mechanical structure of the turning unit 20 but also the maximum turning angle set by the control unit 300.

REFERENCE SIGNS LIST 1 steering device
100 reaction force generating device 101 steering shaft
102 torque sensor
110 direct drive motor
120 electromagnetic brake
121 electromagnetic unit
122 second friction plate
123 first friction plate
130 housing
160 steering angle regulating mechanism
161 rotating substrate
162 guide ball
171 first spring (spring)
172 second spring (spring)
200 steering member
220 turning force generating unit
300 control unit
400 wheel

What is claimed is:

1. A reaction force generating device for a steering device, the reaction force generating device comprising:
   a steering shaft connected to a steering member on which a steering operation is to be performed by a driver;
   a direct drive motor connected to the steering shaft and configured to generate reaction torque; and
   an electromagnetic brake configured to generate friction torque and including a first friction portion configured to integrally rotate with the steering shaft, a second friction portion provided to face the first friction portion and to be non-rotatable, and an electromagnetic unit configured to press the second friction portion against the first friction portion,
   wherein the reaction force generating device is configured to
      generate reaction torque by the direct drive motor when a steering angle of the steering member is within a predetermined range, and
      generate reaction torque by combining the reaction torque generated by the direct drive motor and the friction torque generated by the electromagnetic brake when a steering angle of the steering member exceeds the predetermined range.

2. The reaction force generating device according to claim 1, further comprising:
   a steering angle regulating mechanism configured to regulate steering of the steering member when a steering angle of the steering member reaches a first steering angle.

3. The reaction force generating device according to claim 2,
   wherein the steering angle regulating mechanism includes:
   a rotating substrate configured to integrally rotate with the steering shaft, and provided with a spiral groove having two end portions; and
   at least one guide ball arranged in the groove,
   wherein the guide ball comes into contact with these two end portions when the first steering angle is reached,
   wherein the electromagnetic unit is
      non-rotatable around an axis of the steering shaft in an axial direction, and formed with a radial groove in a surface on a side opposite to the second friction portion, and
   wherein the guide ball is arranged at an intersection of the spiral groove and the radial groove.

4. The reaction force generating device according to claim 3,
   wherein the spiral groove is formed in a surface of the rotating substrate facing the surface of the electromagnetic unit on the side opposite to the second friction portion.

5. The reaction force generating device according to claim 4,
   wherein the spiral groove has a first shallow groove portion at which a groove depth is relatively shallow,
   wherein the first shallow groove portion is provided from each end portion of the spiral groove over a first predetermined length, and
   wherein the first shallow groove portion moves the guide ball in a direction of pressing the electromagnetic unit when a steering angle of the steering member becomes equal to or greater than a third steering angle which is less than the first steering angle.

6. The reaction force generating device according to claim 5,
   wherein the spiral groove has a second shallow groove portion at which a spiral groove depth is deeper than that of the first shallow groove portion, and
   wherein the second shallow groove portion is
      provided from each end portion of the spiral groove over a second predetermined length which is shorter than the first predetermined length, and
      configured to move the guide ball in a direction away from the electromagnetic unit when a steering angle of the steering member becomes equal to or greater than a fourth steering angle which is less than the first steering angle and is equal to or greater than the third steering angle.

7. The reaction force generating device according to claim 5, further comprising:
   a spring arranged between the electromagnetic unit and the first friction portion.

8. The reaction force generating device according to claim 2, further comprising:
   a housing in which the direct drive motor, the first friction portion, the second friction portion, the electromagnetic unit, and the steering angle regulating mechanism are accommodated.

9. A steering device of a steer-by-wire manner, comprising:
   the reaction force generating device according to claim 1.

10. The reaction force generating device according to claim 6, further comprising:
    a spring arranged between the electromagnetic unit and the first friction portion.

11. The reaction force generating device according to claim 3, further comprising:
    a housing in which the direct drive motor, the first friction portion, the second friction portion, the electromagnetic unit, and the steering angle regulating mechanism are accommodated.

12. The reaction force generating device according to claim 4, further comprising:
    a housing in which the direct drive motor, the first friction portion, the second friction portion, the electromagnetic unit, and the steering angle regulating mechanism are accommodated.

13. The reaction force generating device according to claim 5, further comprising:
    a housing in which the direct drive motor, the first friction portion, the second friction portion, the electromagnetic unit, and the steering angle regulating mechanism are accommodated.

14. The reaction force generating device according to claim 6, further comprising:
   a housing in which the direct drive motor, the first friction portion, the second friction portion, the electromagnetic unit, and the steering angle regulating mechanism are accommodated.

15. The reaction force generating device according to claim 7, further comprising:
   a housing in which the direct drive motor, the first friction portion, the second friction portion, the electromagnetic unit, and the steering angle regulating mechanism are accommodated.

16. A steering device of a steer-by-wire manner, comprising:
   the reaction force generating device according to claim 2.

17. A steering device of a steer-by-wire manner, comprising:
   the reaction force generating device according to claim 3.

18. A steering device of a steer-by-wire manner, comprising:
   the reaction force generating device according to claim 4.

19. A steering device of a steer-by-wire manner, comprising:
   the reaction force generating device according to claim 5.

20. A steering device of a steer-by-wire manner, comprising:
   the reaction force generating device according to claim 6.

* * * * *